Oct. 1, 1963   D. S. PECK   3,105,308
PRESSURE RATIO SIMULATOR
Original Filed May 6, 1958   4 Sheets-Sheet 1

INVENTOR.
DONALD S. PECK
BY

INVENTOR.
DONALD S. PECK

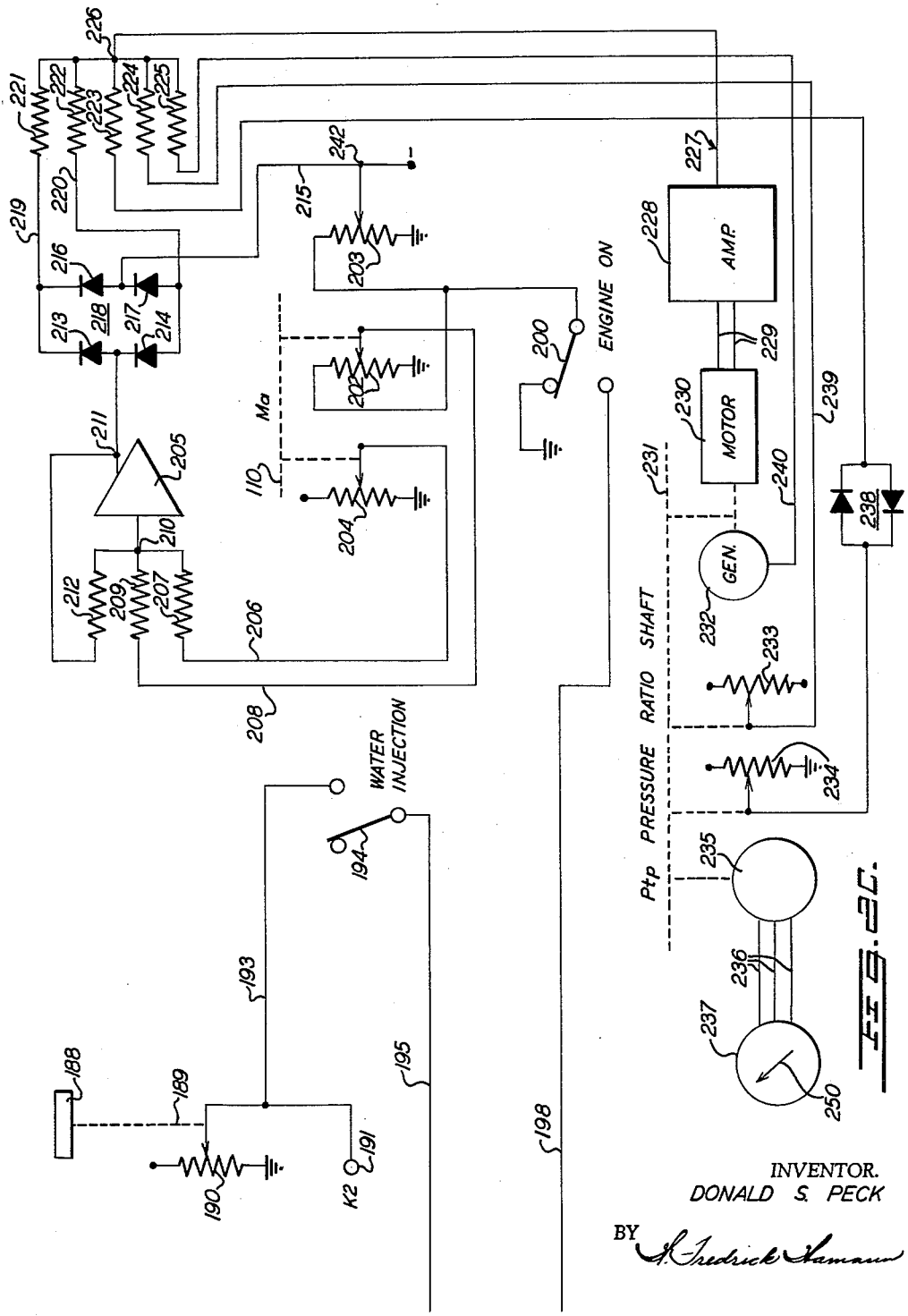

United States Patent Office 3,105,308
Patented Oct. 1, 1963

3,105,308
PRESSURE RATIO SIMULATOR

Donald S. Peck, Silver Spring, Md., assignor to ACF Industries Incorporated, New York, N.Y., a corporation of New Jersey
Continuation of application Ser. No. 733,280, May 6, 1958. This application June 12, 1961, Ser. No. 120,121
4 Claims. (Cl. 35—12)

This application is a continuation of my application Serial No. 733,280, filed May 6, 1958, now abandoned.

The invention relates generally to flight simulators and more particularly to the simulation of pressure ratio in jet engines. More particularly, the invention comprises circuitry for computing a value indicative of the ratio of engine exhaust to inlet total pressure. This value is used as a measure of engine thrust and its value is indicated to student pilots as an instrument or meter reading.

In its preferred embodiment the invention is intended to be used with flight training apparatus comprising electromechanical computers whose output values are analogous to aircraft flight values which are determined in response to the movement of flight control members within the simulated training device. For each aerodynamic quantity which is desired to be simulated, an equation may be written in terms of other flight charatceristic quantities. Such an equation has been written for the solution of the quantity pressure ratio and the circuitry disclosed has been developed to satisfy and solve such an equation for the pressure ratio values of one particular engine. The development of this circuitry in the manner shown however is applicable to the solution of any engine thrust indication system and particularly to the indication of pressure ratio which is desired for a jet engine type of power plant.

Since the pressure ratio value of a jet engine is a function of net corrected thrust and airspeed, both functions must be computed in order to obtain an accurate indication of pressure ratio. Since the airspeed is normally computed for other flight training device indications, the more difficult problem is that of simulating the net corrected thrust of an engine. The net corrected thrust in an actual jet engine represents the combination of steady state thrust, transient thrust, the added thrust due to the use of water injection, and the loss of thrust due to engine ice. In the development of a highly accurate pressure ratio simulator each of these thrust values must be taken into account. This is done herein by computing the values of steady state, transient and water injection thrust, summing them and then decreasing the total by an amount equivalent to the thrust loss due to engine ice. This value of thrust is then modified by airspeed to yield a value equivalent to the engine pressure ratio. This value takes the form of an analog voltage. The ratio of engine exhaust to inlet pressure in this preferred embodiment is physically represented by the angular position of the tail pipe pressure ratio shaft. The shaft rotates between zero and 320° positions, representing pressure ratios between one and the maximum ratio for the engine being simulated, whenever the pressure ratio analog voltage applied to the shaft motor amplifier input differs from the pressure ratio analog voltage representing shaft position. The answer voltage necessary to position the shaft at the existing pressure ratio value is developed by an answer potentiometer attached to the pressure ratio shaft. Shaft driven synchros serve as transmitters for the pilot's and instructor's pressure ratio instruments.

One method by which flight and engine characteristic values may be computed, for use with this invention, is that shown in U.S. Patent 2,742,227 to Frank W. Bubb for Electrical Computer for Solving Simultaneous Equations, which is incorporated herein by reference. Any method may be used which computes the solution to simultaneous equations, and activates a variable impedance according to the solution. The preferred embodiment of this invention utilizes this computed value to operate an electromechanical servo or integrator shaft to move the arms of potentiometers in accordance with the angular position of the shaft. By this method the equations of flight and engine operation are mechanized to compute the value of engine pressure ratio and present the result to a student pilot.

It is therefore a broad object of this invention to provide means for simulating a thrust indicating system for use with engines.

It is a further object of this invention to provide means for indicating the pressure ratio of exhaust to input pressures of a jet engine.

It is a still further object to provide circuitry for simulating the pressure ratio value and the indication of same for jet engine operation.

It is a still further object of this invention to provide electromechanical apparatus for use in a grounded flight trainer which will compute and indicate to a student the value of pressure ratio of a jet engine in response to the student's movement of control members.

The invention embodies other novel features, details of construction and arrangement of parts which are hereinafter set forth in the specificaton and claims and illustrated in the accompanying drawings, which are hereby made a part of the specification, wherein:

FIGS. 2A, 2B and 2C are interconnecting schematic portions of the simulated pressure ratio system.

The invention utilizes a plurality of function and linear potentiometers operative in accordance with electromechanical shafts, as well as summing amplifiers and diode selector circuits to compute and select the proper values to produce a continuously correct indication of engine pressure ratio.

Figure 1:
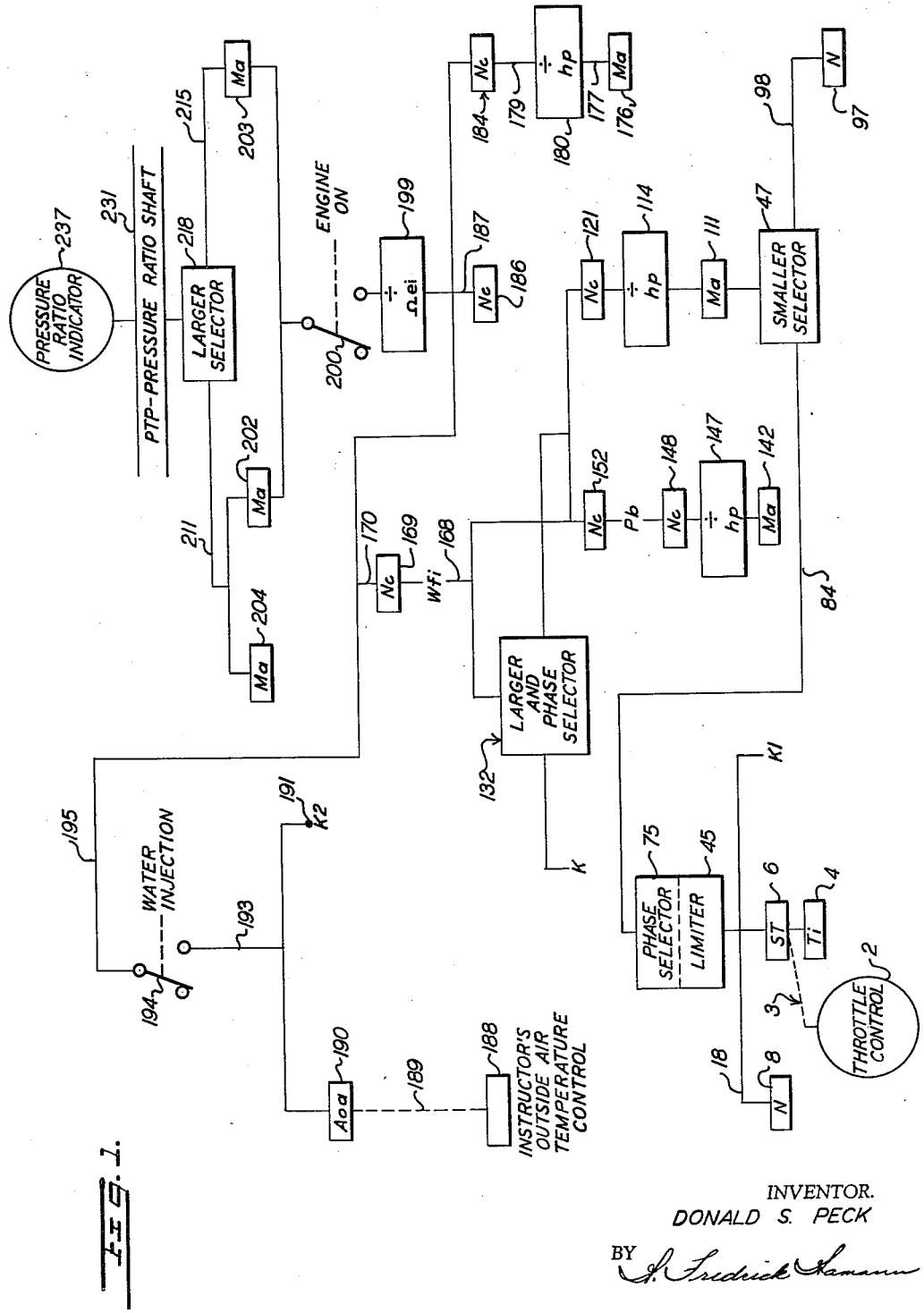
FIG. 1 is a block diagram of the simulated pressure ratio system.

A block diagram of the simulated pressure ratio system is shown in FIG. 1 wherein analog voltage values for transient thrust, steady state thrust and water injection thrust are computed and summed. This sum is modified in accordance with the engine ice effect and the result conducted to Mach or airspeed potentiometers which multiply the thrust value by the airspeed value, resulting in an engine pressure ratio value to activate a pressure ratio shaft which in turn controls a pressure ratio indicator.

In reference to FIG. 1, the small rectangular blocks represent potentiometers, the letter designation within the block indicating what characteristic variable alters the multiplying or dividing potentiometer arm position. The letter designations and their charatceristic variables are $A_{oa}$, outside air temperature; $M_a$, Mach; $N$, r.p.m.; $N_c$, corrected r.p.m.; $S_t$, throttle position; $T_i$, inlet temperature; $h_p$, altitude; and $\Omega_{ei}$, engine ice. The circuit branch containing $A_{oa}$ potentiometer 190 develops the water injection thrust, the branch containing $N_c$ potentiometer 169 develops the transient thrust, and the two branches containing the $N_c$ potentiometers 184 and 186 develop the steady state thrust. The sum of all of these is conducted to engine ice potentiometer 199 and its output is conducted to the Mach potentiometers 202 and 203. A straight line between potentiometers indicates a multiplication relationship while a rectangle containing a division sign indicates that the preceding value is divided by a functon of the variable appearing in the rectangle containing the division sign. Various magnitude and phase selectors are utilized to select one of two values to be used in the computation and these will be more fully described in the detailed operation description.

Figure 2A:
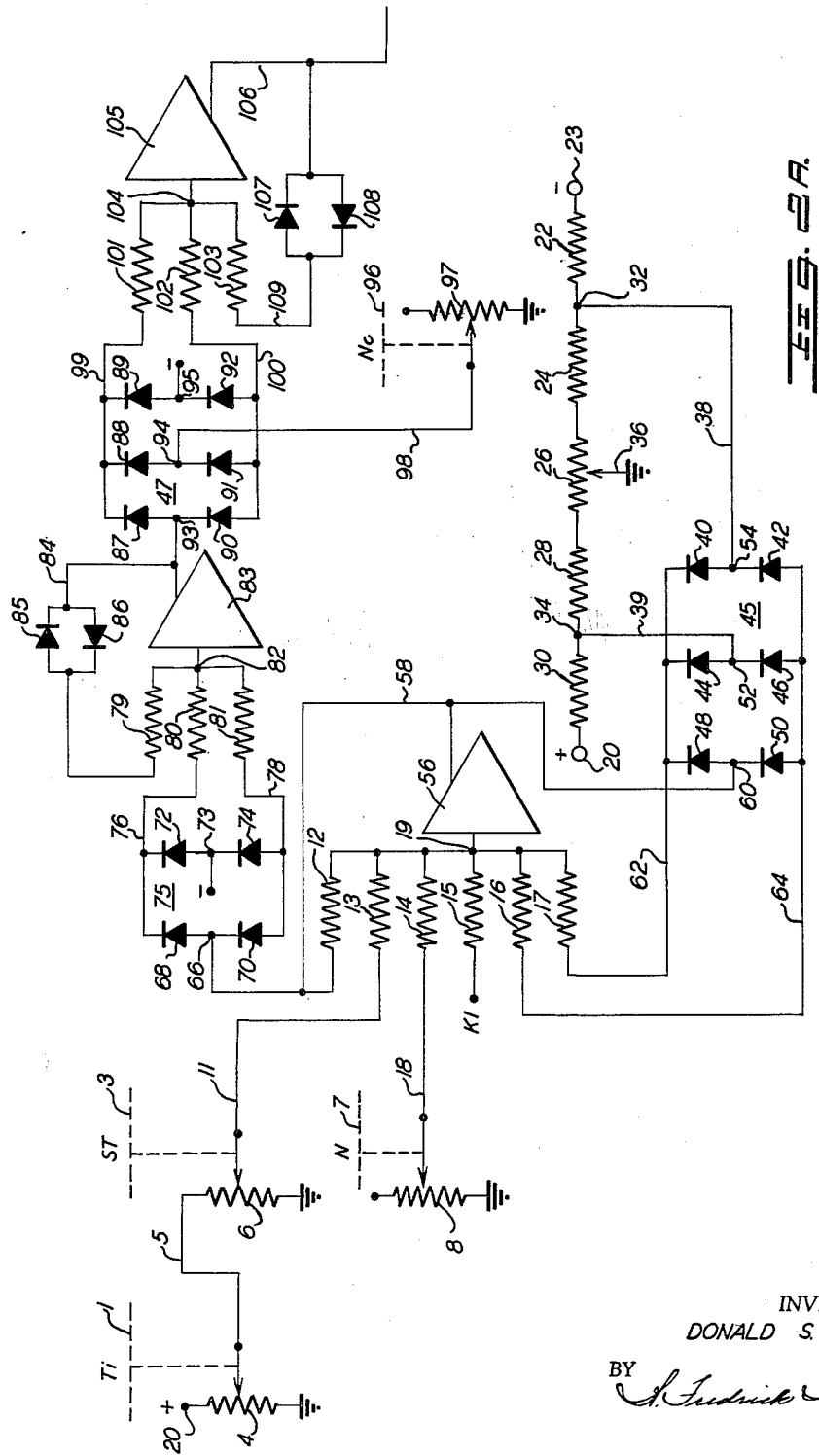
Figure 2B:
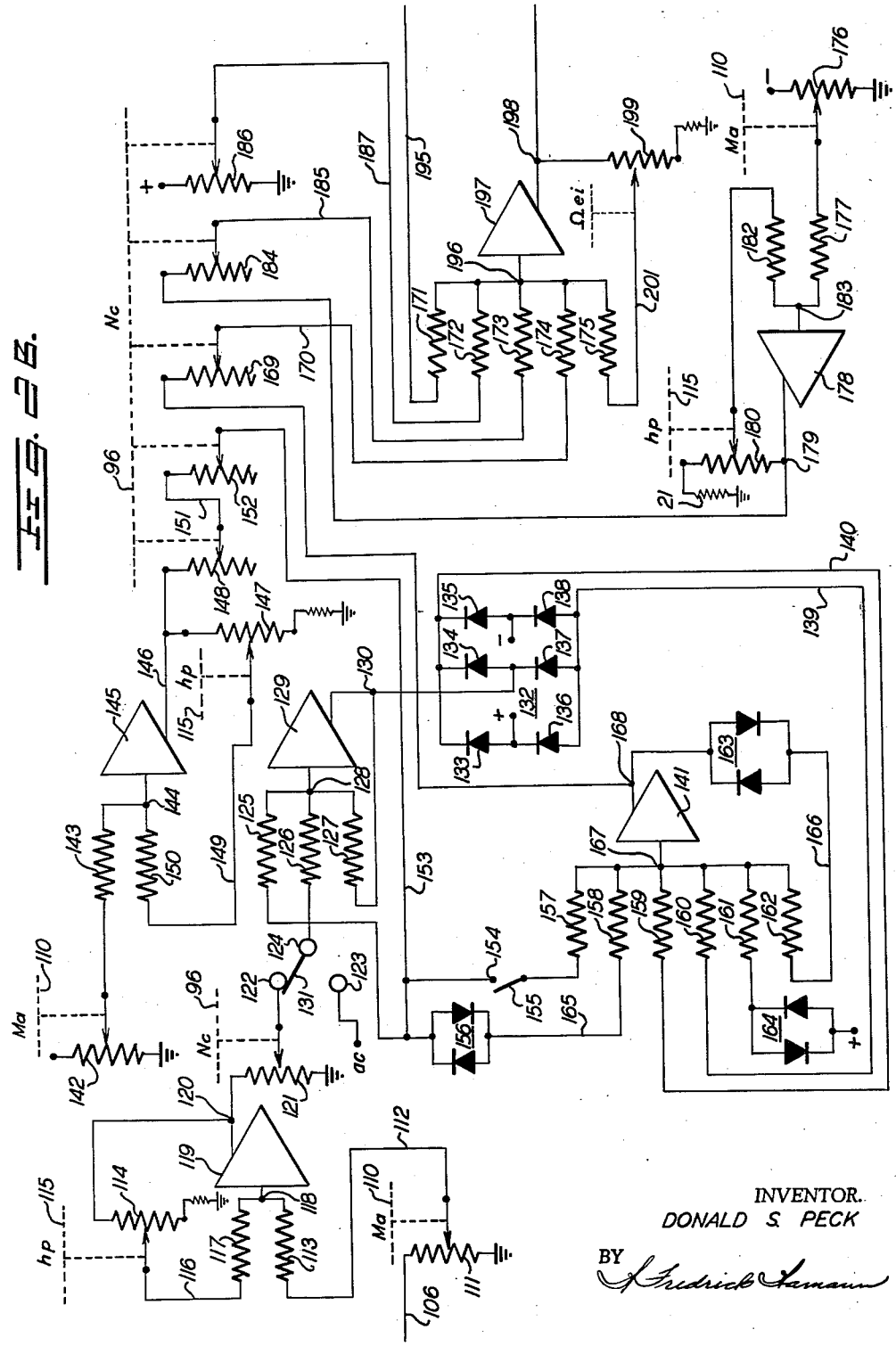

Referring to FIGS. 2A, 2B and 2C which taken together constitute the schematic diagram of the preferred embodiment of the invention the mechanical drive 1, representing total inlet temperature, is connected so as to activate the arm of potentiometer 4. A positive phase voltage source is applied to one terminal of potentiometer 4, the other terminal being tied to ground potential. The arm of potentiometer 4 is connected by conductor 5 to one side of potentiometer 6, the arm of which is driven by mechanical shaft 3 is accordance with the position of the throttle control. The potential at the arm of potentiometer 6 is connected by connector 11 to the input impedance 13. Potentiometer 8 which has an arm driven by the mechanical shaft 7 of the r.p.m. shaft conducts a potential on conductor 18 to input impedance 14. A constant voltage K1 is applied to input impedance 15.

An arrangement of 5 impedances 22, 24, 26, 28 and 30 serially connected between a negative phase A.C. source 23 and a plus phase A.C. source 20 supplies voltages to diode junctions 52 and 54. The impedance 26 comprises a rheostat having its arm 36 connected to ground. The potential at junction 34 located between impedances 28 and 30 is conducted by connector 39 to the junction 52 between silicon diodes 44 and 46. The potential at junction 32 between impedances 22 and 24 is connected by conductor 38 to the junction 54 which is connected between the diodes 40 and 42. The output of amplifier 56 is connected by conductor 58 to the junction 60 interposed between diodes 48 and 50. Conductor 62 interconnects diodes 40, 44 and 48 with input impedance 17 of amplifier 56. Conductor 64 interconnects diodes 42, 46, and 50 with input impedance 16 of summing amplifier 56. The preceding represents the component parts of the limiter 45.

The output 58 of amplifier 56 is also connected to feedback input impedance 12 and to the junction 66 between diodes 68 and 70 of phase selector 75. Diodes 72 and 74 are serially connected between conductors 76 and 78 which are connected to input impedances 80 and 81, respectively. A junction 73 between diodes 72 and 74 is connected to the negative phase A.C. source 23. Input impedances 79, 80 and 81 are joined at junction 82 to form the input to summing amplifier 83 whose output 84 is fed to diode pair 85 and 86 and also to junction 93 between the diode pair 85 and 86 and also to junction 93 between the diode pair 87 and 90 which forms a portion of the magnitude and phase selector 47. The mechanical shaft 96 which represents corrected r.p.m. is connected to operate the arm of potentiometer 97 which is connected by conductor 98 to the junction 94 between the diode pair 88 and 91 of the magnitude and phase selector 47. A negative phase A.C. source is connected to junction 95 between diode pair 89 and 92 which are, in turn, connected to conductors 99 and 100. These last named conductors are tied to input impedances 101 and 102 which are tied along with impedance 103 to the junction 104 of summing amplifier 105 whose output 106 is tied to the feedback diode pair 107 and 108 and also to one side of potentiometer 111 which is driven by the mechanical shaft 110 representing Mach. The diode pair 107, 108 is connected to input impedance 103 by means of conductor 109.

The arm of potentiometer 111 is connected to input impedance 113 by conductor 112. Junction 118 which ties impedances 117 and 113 acts as the input to summing amplifier 119 whose output 120 is fed to potentiometer 114 on the altitude shaft 115. The output of this potentiometer is conducted by connector 116 to input impedance 117. The output of the amplifier 119 is also tied to one side of the corrected r.p.m. potentiometer 121. The arm of potentiometer 121 is connected to contact 122 of the switch 131. A second contact 123 of switch 131 is connected to minus phase A.C. The arm contact 124 of switch 131 is connected to input impedance 126. Input impedance 126 along with input impedances 125 and 127 are connected together at junction 128 to form the input to summing amplifier 129 whose output is indicated as 130. This output is fed back to input impedance 127 and also to the larger and phase selector 132. This selector comprises diodes 133, 134, 135, 136, 137 and 138. The output of selector 132 is connected by conductors 139 and 140 to the input impedances 160 and 159 of summing amplifier 141.

Potentiometer 142 on Mach shaft 110 provides a voltage to impedance 143 which is conducted to junction 144 of summing amplifier 145. The output of this amplifier 145 is connected to division potentiometer 147 on the altitude shaft 115 and to potentiometer 148 on the corrected r.p.m. shaft. The arm of potentiometer 147 is connected by conductor 149 to the impedance 150. The arm of potentiometer 148 is connected by conductor 151 to potentiometer 152 which is also mounted on the corrected r.p.m. shaft. The output or arm of this potentiometer is connected by conductor 153 to input impedance 125, to contact 154 of switch 155 and also to the diode pair 156. The output side of diode pair 156 is connected by conductor 165 to the input impedance 158. Input impedance 157 interconnects switch 155 with junction terminal 167. A positive phase A.C. voltage is applied to diode pair 164 whose output is connected to input impedance 161. The input impedances 157, 158, 159, 160, 161 and 162 comprise the input signals to summing amplifier 141 which are summed at terminal 167.

The output of amplifier 141 is fed by conducting means 168 to the diode pair 163 and from there by conductor 166 to input impedance 162. The output 168 is also fed to potentiometer 169 on the corrected r.p.m. shaft, the output voltage being connected by conductor 170 to the input impedance 174. Potentiometer 176 on the Mach shaft conducts a potential analogous to Mach to input impedance 177 of summing amplifier 178 whose output 179 is fed to the altitude potentiometer 180 which comprises a division circuit including impedance 21. The arm of potentiometer 180 feeds a voltage to the input impedance 182 where it is summed at junction 183 with that potential appearing on impedance 177. The output 179 is fed to potentiometer 184 whose output in turn is fed by conductor 185 to the input impedance 173. A function of corrected r.p.m. is generated by potentiometer 186 which is fed by conductor 187 to the input impedance 172.

An outside air temperature control knob 188 controls the mechanical shaft 189 to position the arm of potentiometer 190 in accordance with outside air temperature. The voltage appearing on the arm of potentiometer 190 along with the constant value K2 at terminal 191 is conducted by connector 193 to the water injection switch 194 whose arm is connected by conductor 195 to input impedance 171 of summing amplifier 197. The inputs to amplifier 197 comprise those voltages which appear across impedances 171, 172, 173, 174 and 175 which are summed at junction 196. The output 198 of amplifier 197 is connected to the engine ice potentiometer 199 and to the engine ON switch 200. The voltage appearing on the arm of potentiometer 199 is conducted by connector 201 to input impedance 175.

The arm terminal of the engine ON switch 200 is tied to potentiometers 202 and 203. The arm of potentiometer 202 and the arm of potentiometer 204 comprise inputs to summing amplifier 205, the arm of potentiometer 204 being connected by conductor 206 to the input impedance 207 while the arm of potentiometer 202 is connected by conductor 208 to input impedance 209. Voltages from these two potentiometers are summed at junction 210 and are fed to the amplifier 205 whose output 211 is fed to impedance 212 as a feedback voltage. The output 211 is fed to the junction of diodes 213 and 214 while the output of potentiometer 203 is fed by conductor 215 to the junction of the diode pair 216 and 217 of the larger selector 218.

The outputs of selector 218 appears on conductors 219 and 220 and are applied to input impedances 221 and 222. Junction 226 sums the potentials appearing at impedances 221, 222, 223, 224 and 225 and conducts them by conductor 227 to amplifier 228 whose output is applied by conductors 229 to the motor 230. The motor shaft 231 drives the generator 232 and positions the arms of potentiometers 233 and 234 as well as the rotor of synchro 235. Synchro 235 transmits angular information by conductors 236 to the pressure ratio indicator 237. Diode pair 238 interconnects the arm of feedback potentiometer 234 and the input impedance 223. The arm of stop potentiometer 233 is connected by conductor 239 to the input impedance 224 while the output of generator 232 is connected by conductor 240 to input impedance 225.

*Operation*

The invention in its preferred embodiment provides a pressure ratio indication to a student pilot. The pressure ratio gauge indicates the ratio of engine exhaust to inlet total pressure and is used as a measure of engine thrust. Whenever the engine is not operating, the inlet and exhaust pressures being equal, the associated pressure ratio gauge indicates one. In the pressure ratio computer the ratio of engine exhaust to inlet pressure is represented by the angular position of the tailpipe pressure ratio shaft. The shaft rotates between zero and 320° positions representing pressure ratios of one and the maximum value for the engine being simulated whenever a positive phase voltage is applied to the shaft motor amplifier input. The answer voltage necessary to position the shaft at the existing pressure ratio value is developed by potentiometer 234. A shaft driven synchro 235 serves as transmitter for the pilot's pressure ratio gauge 237. The voltage source for the pressure ratio shaft input signal is obtained from amplifier 228 whose output represents a value of engine pressure ratio. Since the pressure ratio value is a function of corrected net thrust and air speed the voltage output of summing amplifier 197 is multiplied by Mach number potentiometers 202 and 203 prior to application at summing amplifier 205 and junction 242. The fixed negative phase voltage applied to junction 242, representing a pressure ratio of 1, produces a signal at junction 242 simulating pressure ratios during low thrust and Mach number operation. The combination thrust and Mach number signals applied to summing amplifier 205 produce an output voltage representing pressure ratio values during high thrust and Mach number operation.

To provide accurate simulation during all conditions of flight the outputs of summing amplifier 205 and junction 242 are applied to magnitude selector 218. With the outputs of the same phase thus connected, the tailpipe pressure ratio is determined by the larger of the two voltages fed to the selector. In the development of tailpipe pressure ratio, Equation 1 represents the tailpipe pressure ratio as a function of corrected net thrust and Mach number.

(1) $Ptp = K34[1.0 + .00009 MaFc]$
$+ (1-K34)[f220Ma + f221MaFc]$

The pressure ratio is equal to the greater of the two expressions which make up Equation 1. The first portion of Equation 1 is the expression for pressure ratio at low Mach numbers and thrust. The second portion of Equation 1 is the expression of pressure ratio at higher Mach numbers and thrust. Equation 2 represents the corrected net thrust in terms of corrected parameters. The equation is expressed as the summation of the steady state, water injection and transient thrust components.

(2)
$$Fc = K33 \left\{ f215Nc - \frac{f218Maf230Nc}{f222hp} \right.$$
$$\left. + K29(3164Aoa + 968) + 119.5 f231NcWfi \right\} 1 - .10\Omega ei$$

The portions of Equation 2, made up of the $f215$ and $f218$ terms, represent the steady state corrected net thrust modified to include duct losses. The portion of Equation 2, made up of K29 and its multiplier, represents the added increment of net thrust due to water injection. Water injection net thrust is modified by the effect due to outside air temperature. The portion of Equation 2, made up of $(1 - .10\Omega ei)$, represents the decrease in corrected net thrust due to engine ice. The portion of Equation 2, $119.5 f231NcWfi$, represents the transient net thrust. The transient net thrust diminishes to zero as the engine obtains equilibrium. Equation 3 represents the incremental fuel flow Wfi that determines the engine acceleration rate in the transient tailpipe temperature and thrust as a function of the governing acceleration steady state fuel flow, maximum burner pressure, limiting fuel flow, burner pressure and minimum fuel flow. When the engine is operating in a steady state condition Equation 3 is equal to zero.

(3) $Wfi = .00543Pb\{K23K26K28K35Wfg$
$+ 1.1K26(K28-1) + K23K26(1-K35)f208Nc$
$- [(K23) + (1-K26)]f224Nc\} + .180(1-K26)$
$+ 1.39(1-K23)$ $.00543Pb$ represents the ratio of burner pressure to maximum burner pressure; $.00543Pb\{K35K23K26K28Wfg\}$ of Equation 3 represents the governing fuel flow in the normal operating region, Wfg being equal to zero when steady state engine speed has been obtained.

$.00543Pb\{-(1-K23)f224Nc\} + 1.39(1-K23)$ of Equation 3 represents the engine functioning at the maximum burner pressure limit, Wfi being equal to zero when steady state corrected fuel flow $f224Nc$ as a function of burner pressure, is equal to 1.39 lbs. per second.

$.00543Pb\{-(1-K26)f224Nc\} + .180(1-K26)$ of Equation 3 represents the engine tending to operate below the minimum fuel flow stop, Wfi is equal to zero when steady state corrected fuel flow $f224Nc$ as a function of burner pressure is equal to .180 lb. per second.

$K23K26K28K35Wfg + 1.1K26(K28-1)$ of Equation 3 represents the deceleration fuel flow as specified by the fuel regulator's droop line. When the governing fuel flow rate is minus 1.1 lb. per second.

Referring to FIG. 1 the development of a pressure ratio value from the four major pressure ratio effects is shown in block diagram form. As expressed in equation forms above the pressure ratio is made up of the summation of steady state thrust modified to include duct losses, transient net thrust which diminishes to zero as the engine obtains equilibrium, that amount of thrust resulting from the use of water injection and the decrease in thrust due to engine ice. Each of these items is computed and an analog voltage which results is utilized to position an electromechanical device for driving an indicator providing the student information regarding pressure ratio.

The steady state thrust is computed by a potentiometer 176 on Mach shaft whose input is fed by menas 117 to potentiometer 180 on the altitude shaft which effectively divides the function of Mach by a function of altitude. The output being conducted by conductor 179 to the function potentiometer 184 on the corrected r.p.m. shaft. This value along with the analog voltage from potentiometer 186 which is conducted by connector 187 to input impedance 172, of FIG. 2B, constitutes the steady state thrust value.

That thrust due to the use of water injection is developed by an instructor's outside air temperature control 188 which by mechanical shaft 189 alters the arm of potentiometer 190 so as to provide the voltage analogous to instructor's outside air temperature to conductor 193 along with a constant value K2 at terminal 191. This voltage is switched on and off to the main computer by means of water injection switch 194 to that whenever water injection is selected by the student pilot a voltage analogous to the thrust resulting from the use of water injection is conducted by conductor 195 to be summed with the other thrust values.

Again referring to FIG. 1, the method of computing the transient net thrust will now be described. A potentiometer 4 driven by the inlet temperature shaft supplies a voltage to a potentiometer on the throttle control shaft 3 which is operated directly by the student's movement of the throttle control 2. The output of this potentiometer 6 is summed with information from an r.p.m. potentiometer 8 and a constant value K1, the total being sent to a limiter 45 whose output is conducted to phase selector 75. This selector's output is conducted by connector 84 to the smaller selector 47 which selects the smaller of the two voltages appearing on the leads 84 and 98, the analog voltage on conductor 98 having originated at potentiometer 97 which is mounted on the corrected r.p.m. shaft. The output of the smaller selector 47 is conducted to Mach potentiometer 111 and from there to a divider potentiometer 114 on altitude shaft, the output of this potentiometer in turn being sent to function potentiometer 121 on the corrected r.p.m. shaft.

Other information needed to compute a transient net thrust of the engine is developed by Mach potentiometer 142 which is sent to the divider potentiometer 147 and from there to the corrected r.p.m. potentiometer 148. The output of potentiometer 148 represents Pb, the ratio of burner pressure to maximum burner pressure and is conducted to the corrected r.p.m. potentiometer 152. This value is sent directly to be summed with other information to compute fuel flow and is summed with the output of potentiometer 121 to make up one input to the larger and phase selector 132. The output of this selector 132 is summed with the output of corrected r.p.m. potentiometer output 152 at 168 and is then conducted to the corrected r.p.m. potentiometer 169. The value appearing on conductor 170 is analogous to the transient net thrust of the engine.

The combination of water injection thrust, transient net thrust, and steady state thrust is applied to the potentiometer 199 on the engine ice shaft. The effect of this potentiometer is to decrease the thrust in accordance with the decrease which would occur from the presence of icing in the engine of an actual aircraft. The output of this potentiometer is controlled in an ON/OFF manner by the engine ON switch 200. Operation of this switch to the ON position applies the analog voltage from potentiometer 199 to the Mach potentiometers 202 and 203. The output of 202 being combined with Mach potentiometer 204 to make up input 211 to the larger selector 218. The output of potentiometer 203 is conducted along connector 215 to make up the other input to the larger selector 218. The larger of the two values appearing on conductors 211 and 215 is conducted to the pressure ratio shaft to position it thereby driving the pressure ratio indicator.

Referring to FIGS. 2A, 2B and 2C, which when taken together show the preferred embodiment of the invention in schematic form, it is seen that the primary value to be utilized by the pressure ratio shaft 231 is that value appearing on conductor 198. This value is analogous to the net corrected thrust of the engine simulation. Its value is made up of analog voltages equivalent to that thrust present due to the steady state operation of the jet engine, that amount of thrust present due to the utilization of water injection, that amount of transient net thrust due to movement of the throttle conrol, altitude, corrected r.p.m. and Mach and which is primarily dependent on fuel flow changes, and the decrease in net thrust due to icing of the engine. Taken in the order just mentioned the steady state thrust is computed by function potentiometer 176 which conducts an analog voltage of Mach to impedance 177 where it is summed with the voltage from impedance 182 at junction 183 to feed summing amplifier 178. This output is fed to the division potentiometer 180 on the altitude shaft so as to divide the function of Mach by the function of altitude, the resultant appearing on conductor 179 and being used as a multiplier of the function appearing at potentiometer 184 of the corrected r.p.m. shaft. The voltage thus appearing on the conductor 185 representing $$\frac{f218Maf230Nc}{f222hp}$$

and the voltage appearing on conductor 187 from potentiometer 186 representing $f215Nc$ together comprise the analog voltage of the steady state thrust as mentioned in the first portion of Equation 2 above.

The mechanization of the second portion of Equation 2 representing water injection thrust is accomplished by an instructor's outside air temperature control 188 which alters the position of the arm of potentiometer 190 whose analog voltage value, plus the constant voltage K2 appearing at terminal 191, are summed at conductor 193 and are applied to input impedance 171 upon the operation of the water injection switch 194. The voltage thus being fed by conductor 195 is analogous to the thrust of the engine resulting from the use of water injection by the student pilot.

The complex determination of the transient net thrust resulting from the operation of flight control members will now be described in relation to Equation 3 and FIGS. 2A and 2B. Equation 3 is mechanized by feeding a voltage from potentiometer 4 analogous to inlet temperature to potentiometer 6 on the throttle shaft 3 whose arm position is dependent upon the student's movement of the throttle control. This multiplication of function results in a voltage at conductor 11 which is analogous to the multiplication of function of inlet temperature times function of throttle and may be expressed as $66.7f205Tif204St$. This value is summed along with a constant value K1 and an r.p.m. value appearing on conductor 18. A limiter 45 feeds a plus and minus phase voltage to the diode pairs 44—46 and 40—42 which provides limiting action for the output 58 of amplifier 56 so that the sum total fed back to the amplifier on conductors 62 and 64 will be zero unless the output of the amplifier 56 exceeds in magnitude the values applied at conductors 38 and 39 which are out of phase with each other. The output of amplifier 56 represents $1.1+Wfg$ and is conducted by 58 to the phase selector 75 which will allow all positive phase selector input voltages to appear across impedances 80 and 81 or will allow a negative phase to appear across 80 and 81 if it exceeds in magnitude the negative phase applied at junction 73. This value is then conducted to the smaller selector 47 which compares the value appearing at conductor 84 representing $5.5-[WfgK28+1.1(K28-1)]$ with the value appearing on conductor 98 representing $5.5-f208Nc$ from the corrected r.p.m. potentiometer 97. The larger of these values will be conducted through the diode pairs 87—90 and 88—91 and will have subtracted from it the out of phase value equivalent to $-5.5$ at junction 95. It is thus seen that if the $f20Nc$ term is larger than the K28 term than the $5.5-K28$ term will be larger and will pass through the selector. When 5.5 is subtracted the smaller K28 term is passed to the amplifier 105. Summing amplifier 105 output 106, analogous to $$K35K28Wfg+1.1(K28-1)+(1-K35)f208Nc$$

is multiplied by potentiometer 111 on the Mach shaft 110. This value appearing on conductor 112 is applied to impedance 113 so as to be utilized with amplifier 119 in the division of an altitude function by potentiometer 114. This division of Mach by altitude results in a voltage appearing at conductor 120 which is then sent to potentiometer 121 on the corrected r.p.m. shaft. This value, representing $$-.0054Pb\{K35K28Wfg+1.1(K28-1) \\ +(1-K35)f208Nc\}$$

in turn is selected or rejected by switch 131 which determines one of the inputs to summing amplifier 129.

Amplifier 129 in turn feeds the larger and phase selector 132. Constant values of plus and minus voltages are also fed to the selector 132.

A second input to summing amplifier 129 is derived from potentiometer 142 which is divided by altitude potentiometer 147 so as to supply on conductor 146 a voltage analogous to $f212Na/f12hp$ which in turn is multiplied by potentiometer 148 on corrected r.p.m. shaft. This value $Pb$ representing burner pressure in turn is multiplied by a second potentiometer 152 on corrected r.p.m. shaft, the output being sent to the fuel flow summing amplifier 141 by means of diode pair 156 and switch 154 which is dependent on a selector responsive to the constant K23. Amplifier 141 therefore receives analog voltages from the larger and phase selector 132 and also from Mach, altitude and corrected r.p.m. potentiometer functions. The output of summing amplifier 141 represents $Wfi$ and is equivalent to the fuel flow that determines the engine acceleration rate and the transient thrust as a function of the governing acceleration, steady state fuel flow, maximum burner pressure, limiting fuel flow burner pressure and minimum fuel flow. The $Wfi$ voltage is conducted to potentiometer 169 the output of which represents the transient net thrust in accordance with Equation 3 above.

This transient thrust value along with the water injection thrust value and the steady state thrust value are summed at junction 196 and appear across the engine icing potentiometer 199 so as to divide the beforementioned functions by a function of engine ice. The output therefore appearing on conductor 198 is equivalent to net corrected thrust $Fc$ and is conducted through the engine ON switch to Mach potentiometers 202 and 203. This information is sent by conductors 215 and 208 to be utilized by the larger selector 218 which allows only the passage of the larger voltage since the two applied are of the same phase. One input to this selector is the output of potentiometer 203 plus a constant equal to 1 while the other input to the selector comprises the summation of those functions appearing at potentiometers 202 and 204. The larger selector 218 supplies the information to be summed at junction 226 which activates the amplifier 228 to operate the motor 230 to drive the shaft 231. The answer voltage is fed back by potentiometer 234 and electrical stop information is conducted to the summing point from potentiometer 233. This pressure ratio shaft 231 drives the rotor of synchro 235 which by three phase electrical connectors 236 attach to the stator or synchro receiver 237 so as to activate the rotor of synchro 237 upon which the pressure ratio indication pointer 250 is mounted. This pointer represents on the dial face the pressure ratio for the engine being simulated and will constantly give the correct ratio of engine exhaust to inlet pressure.

Having described a preferred embodiment of the present invention it is to be understood that although specific terms and examples are employed, they are used in a generic and descriptive sense and not for purposes of limitation; the scope of the invention being set forth in the following claims.

What is claimed is:

1. In a grounded jet engine aircraft flight trainer adapted to house a student pilot and having apparatus for computing analogs of aerodynamic flight variables including Mach, altitude, inlet temperature, outside air temperature, r.p.m., corrected r.p.m. and engine ice; a pressure ratio indicator system comprising means responsive to said computing apparatus for developing voltages analogous to values of water injection thrust, steady state thrust, and transient thrust, the steady state analog voltage means having a voltage source, variable potentiometers connected to and operative in accordance with the output of the Mach, altitude and corrected r.p.m. computers, first conducting means interconnecting the voltage source with one of said variable potentiometers, auxiliary conducting means interconnecting the variable potentiometers for deriving therefrom the voltage analogous to steady state thrust, summing means, second conducting means interconnecting the means for developing the analog voltages of steady state thrust, transient thrust and water injection thrust with the summing means, said summing means including means for dividing the thrust analog voltages by the engine ice analog, indicator means, third conducting means interconnecting the summing means with the indicator means whereby the indicator means operates proportionally to the sum of the analog values of steady state, transient, and water injection thrust.

2. In a grounded jet engine aircraft flight trainer adapted to house a student pilot and having control members adapted to be operative by the student for varying the inputs to computers for computing aerodynamic flight variables including Mach, altitude, inlet temperature, outside air temperature, r.p.m., corrected r.p.m., and engine ice, a pressure ratio indicator system comprising means responsive to said computers including potentiometers and selectors for developing voltages analogous to values of water injection thrust, steady state thrust, and transient thrust, the transient thrust analog voltage means being repsonsive to said potentiometers and selectors for computing the transient thrust from analogs of governing acceleration, steady state fuel flow, maximum burner pressure, limiting fuel flow, burner pressure, and minimum fuel flow, summing means, first conducting means interconnecting the voltage analogs of steady state, transient and water injection thrust with the input of the summing means, said summing means including means for dividing said thrust voltage analogs by the engine ice variable, indicator means, second conducting means interconnecting the output of the summing means with the indicator means whereby the indicator means is activated in accordance with the sum of the analog voltages of steady state, transient and water injection thrust, in terms of the ratio of engine exhaust pressure to engine inlet pressure.

3. In a grounded flight trainer for simulating the operation of a jet engined aircraft, a pressure ratio indicator system comprising a first circuit means for deriving a voltage representing engine transient thrust, adjustable means for producing an analog of outside air temperature, a second circuit means responsive to said last mentioned means for deriving a voltage representing water injection thrust, a third circuit means for deriving a voltage representing steady state thrust, means for dividing the sum of the voltages derived by the first, second, and third circuit means by a voltage representing a function of engine icing to thereby derive a voltage representing net corrected thrust, and means for multiplying the voltage representing net corrected thrust by a function of airspeed to derive a voltage representing engine pressure ratio.

4. The invention as set forth in claim 3 wherein the said last named means includes a circuit means to compare the voltage representing engine pressure ratio with a constant voltage representing a pressure ratio of 1 and to select the larger of the two to thereby provide accurate simulation during all conditions of flight.

References Cited in the file of this patent

UNITED STATES PATENTS

| | | |
|---|---|---|
| 2,770,054 | Stern et al. | Nov. 13, 1956 |
| 2,858,623 | Stern et al. | Nov. 4, 1958 |
| 2,859,539 | Sherman | Nov. 11, 1958 |
| 2,882,615 | Dawson | Apr. 21, 1959 |